United States Patent [19]

Taylor

[11] Patent Number: 5,285,389
[45] Date of Patent: Feb. 8, 1994

[54] DUAL MICROPROCESSOR ARCHITECTURE FOR CONTROL OF A CONTINUOUSLY VARIABLE TRANSMISSION

[75] Inventor: Danny R. Taylor, Groton, N.Y.

[73] Assignee: Borg-Warner Automotive Inc., Sterling Heights, Mich.

[21] Appl. No.: 685,993

[22] Filed: Apr. 9, 1991

Related U.S. Application Data

[63] Continuation of Ser. No. 407,599, Sep. 15, 1989, abandoned.

[51] Int. Cl.$^5$ .................... G06F 15/60; B60K 41/00
[52] U.S. Cl. ........................ 364/424.1; 74/866
[58] Field of Search ............ 364/424.1, 132, 200; 74/866; 395/200, 800

[56] References Cited

U.S. PATENT DOCUMENTS

| | | | |
|---|---|---|---|
| Re. 31,361 | 8/1983 | Smirl | 74/863 |
| 3,903,403 | 9/1975 | Ferguson et al. | 235/151.21 |
| 4,220,990 | 9/1980 | Alles | 364/200 |
| 4,414,624 | 11/1983 | Summer, Jr. et al. | 345/800 |
| 4,433,594 | 2/1984 | Smirl | 74/689 |
| 4,458,318 | 7/1984 | Smit et al. | 364/424.1 |
| 4,542,665 | 9/1985 | Yamamura et al. | 74/866 |
| 4,556,955 | 12/1985 | Wright et al. | 364/900 |
| 4,558,416 | 12/1985 | Pauwels et al. | 364/900 |
| 4,566,354 | 1/1986 | Kumura et al. | 74/866 |
| 4,583,627 | 4/1986 | Kumura et al. | 192/0.076 |
| 4,631,043 | 12/1986 | Tokoro et al. | 474/18 |
| 4,648,496 | 3/1987 | Petzold et al. | 192/0.076 |
| 4,653,621 | 3/1987 | Oshiage | 192/0.032 |
| 4,663,714 | 5/1987 | Cornell et al. | 364/424.1 |
| 4,665,773 | 5/1987 | Hiramatsu et al. | 74/866 |
| 4,720,793 | 1/1988 | Watanabe et al. | 364/424.1 |
| 4,730,256 | 3/1988 | Niimi et al. | 364/431.12 |
| 4,793,454 | 12/1988 | Petzold et al. | 192/0.032 |
| 4,811,225 | 3/1989 | Petzold et al. | 364/424.1 |
| 4,846,021 | 7/1989 | Hamano et al. | 74/867 |
| 4,891,759 | 1/1990 | Kato | 364/424.1 |
| 4,899,857 | 2/1990 | Tateno et al. | 192/0.09 |

*Primary Examiner*—Vincent N. Trans
*Attorney, Agent, or Firm*—Willian Brinks Olds et al.

[57] ABSTRACT

A control architecture for controlling continuously variable transmissions includes two microcomputers. A first microcomputer receives certain input signals and performs certain tasks, and a second microcomputer receives other input signals and performs other tasks. A data bus is provided for communicatively interconnecting the microcomputers, and a transfer table associated with each microcomputer has a transmit section of pointers referencing memory locations containing data to be transferred and a receive section of pointers referencing memory locations to receive transferred data. Data is transferred between the microcomputers at regular intervals enabling real time output control signals to be generated.

12 Claims, 5 Drawing Sheets

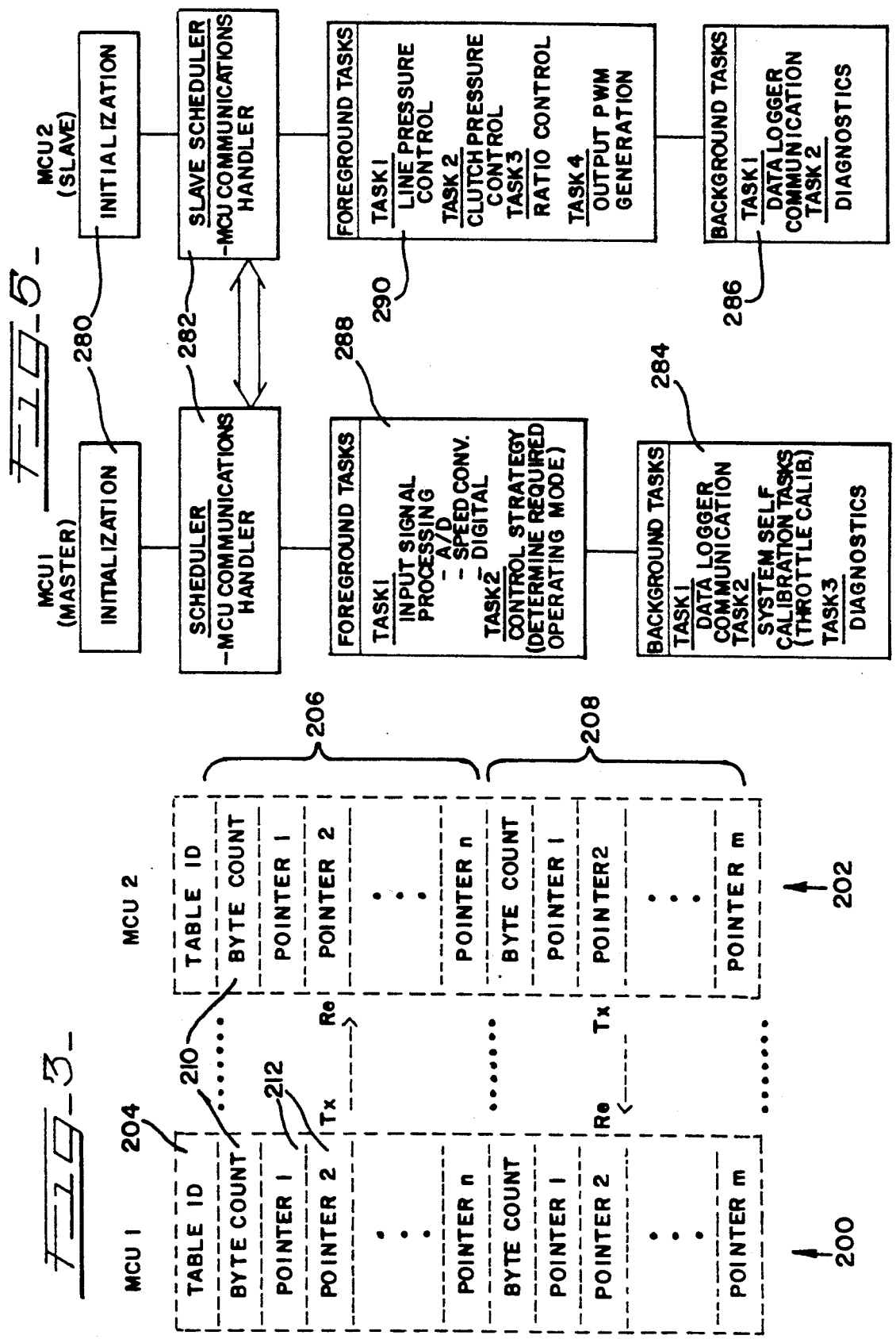

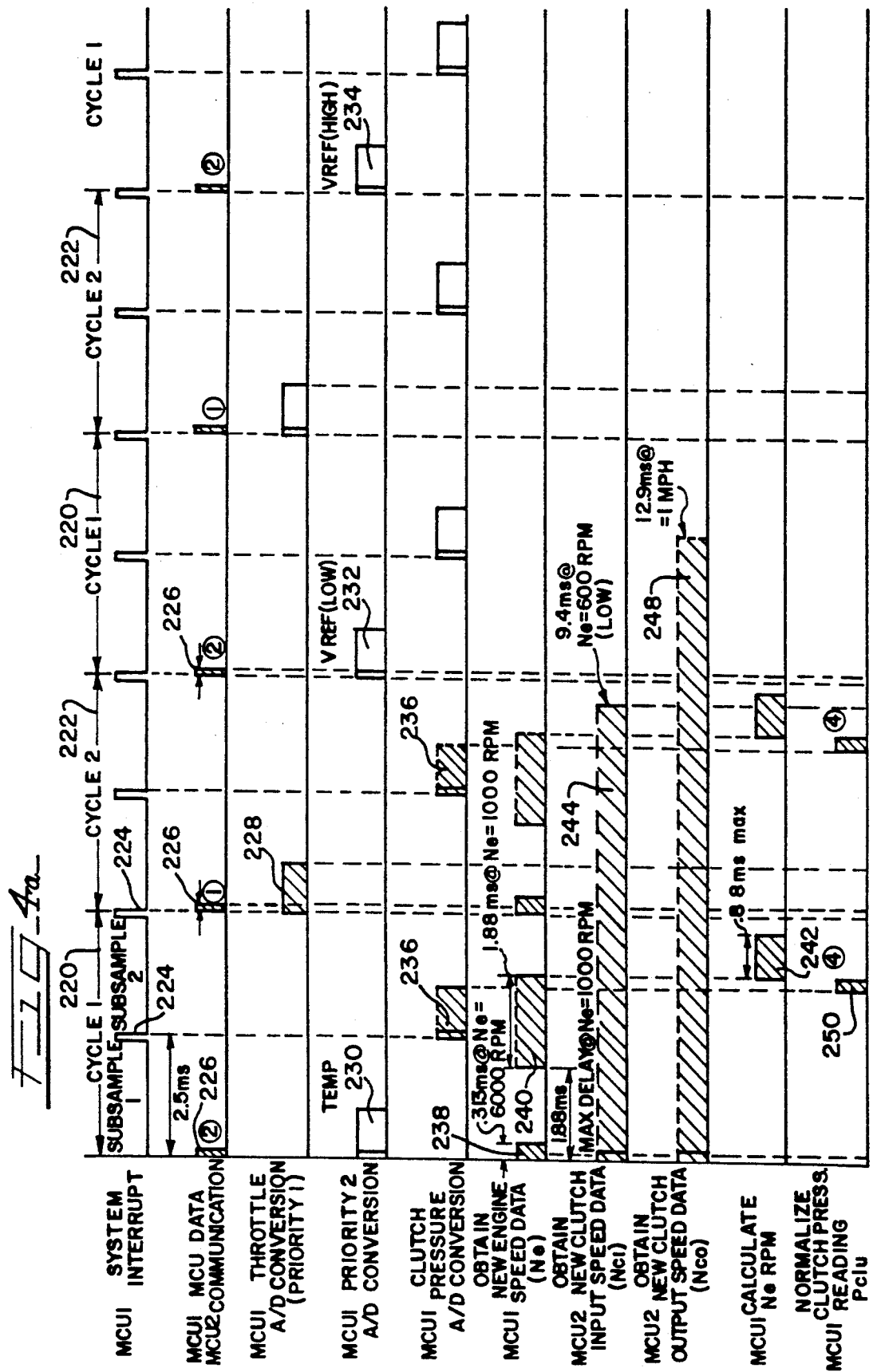

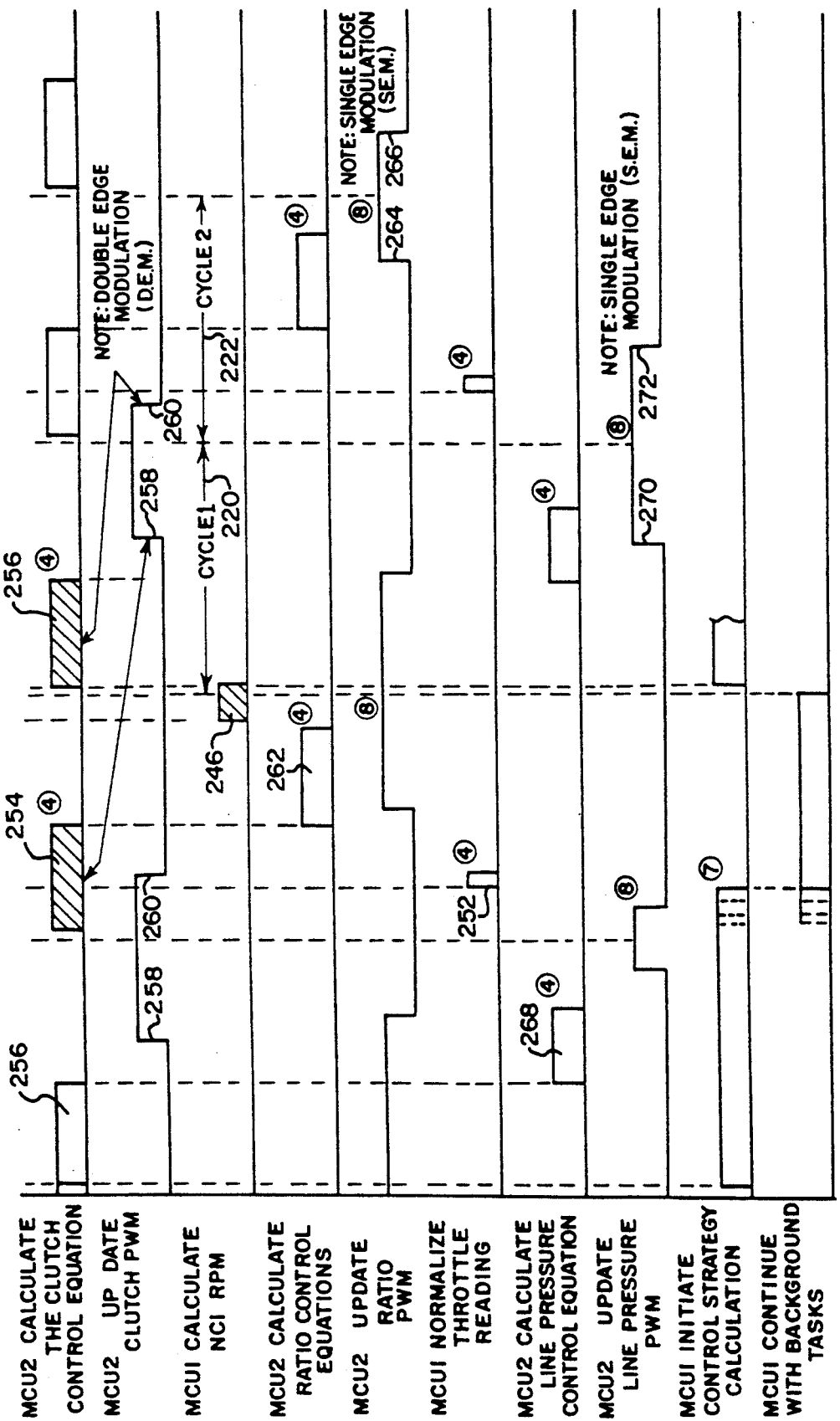

DUAL MICROPROCESSOR ARCHITECTURE FOR CONTROL OF A CONTINUOUSLY VARIABLE TRANSMISSION

This application is a continuation of application Ser. No. 407,599, filed Sep. 15, 1989 now abandoned.

FIELD OF THE INVENTION

The present invention relates generally to vehicular power transmission systems and, more particularly, to control methods and apparatus for continuously variable vehicular transmission systems.

BACKGROUND OF THE INVENTION

A continuously variable transmission (CVT) can be used in a powered vehicle, such a passenger automobile, for coupling engine power to the driving wheels. Unlike typical transmissions which utilize a number of discrete "gear ratios", CVT's utilize a mechanism whereby the effective gear ratio of the transmission is continuously variable within a predetermined range. The effective gear ratio of a CVT in use at any given time is a function of many variables such as engine load and power output.

A control system is used in conjunction with a CVT to monitor input variables and provide signals to control system parameters such as effective gear ratio and clutch engagement. CVT control systems are typically microprocessor based and perform a real time analysis of input parameters and computation of output parameters. Microprocessor based control systems heretofore used have been unable to perform large scale real time computation sufficient to effect smooth operation and good control of the transmission.

It is therefore an object of the present invention to provide a microprocessor based control architecture for continuously variable transmissions that generally overcomes the shortcomings and deficiencies of the prior art.

It is a further object of the present invention to provide such a control architecture that insures smooth operation of the transmission and good control.

SUMMARY OF THE INVENTION

The foregoing and other objects are accomplished by providing a control architecture for continuously variable transmissions that has a first microcomputer that receives certain input signals and performs certain control tasks, and a second microcomputer that receives other input signals, performs other control tasks and generates output control signals. The control architecture also has a means for communicatively interconnecting the first and second microcomputers that includes a bidirectional data bus and a transfer table associated with each of the microcomputers that has a transmit section of pointer bytes referencing memory locations containing information to be transferred and a receive section of pointer bytes referencing memory locations to receive transferred data. Real time control is effected by generating a continuous train of system interrupts at regular intervals, the interrupts being in sets of four with the first of each set defining the beginning of a first cycle and the third of each set defining the beginning of a second cycle, the first and second cycles defining a basic system period. Data is transferred between the microcomputers at the beginning of each cycle and input signals are converted to a form receivable by one of the microcomputers so that received input signals can be processed and output control signals can be generated.

BRIEF DESCRIPTION OF THE DRAWINGS

FIG. 3 illustrates a data transfer table structure for transferring data between microprocessors in the control architecture of the present invention.

FIGS. 4a and 4b are a timing diagram which illustrates the timing of events in accordance with the control architecture of the present invention.

FIG. 5 is a block diagram illustrating the software allocation of tasks performed by the microcomputers.

DETAILED DESCRIPTION

Figure 1:
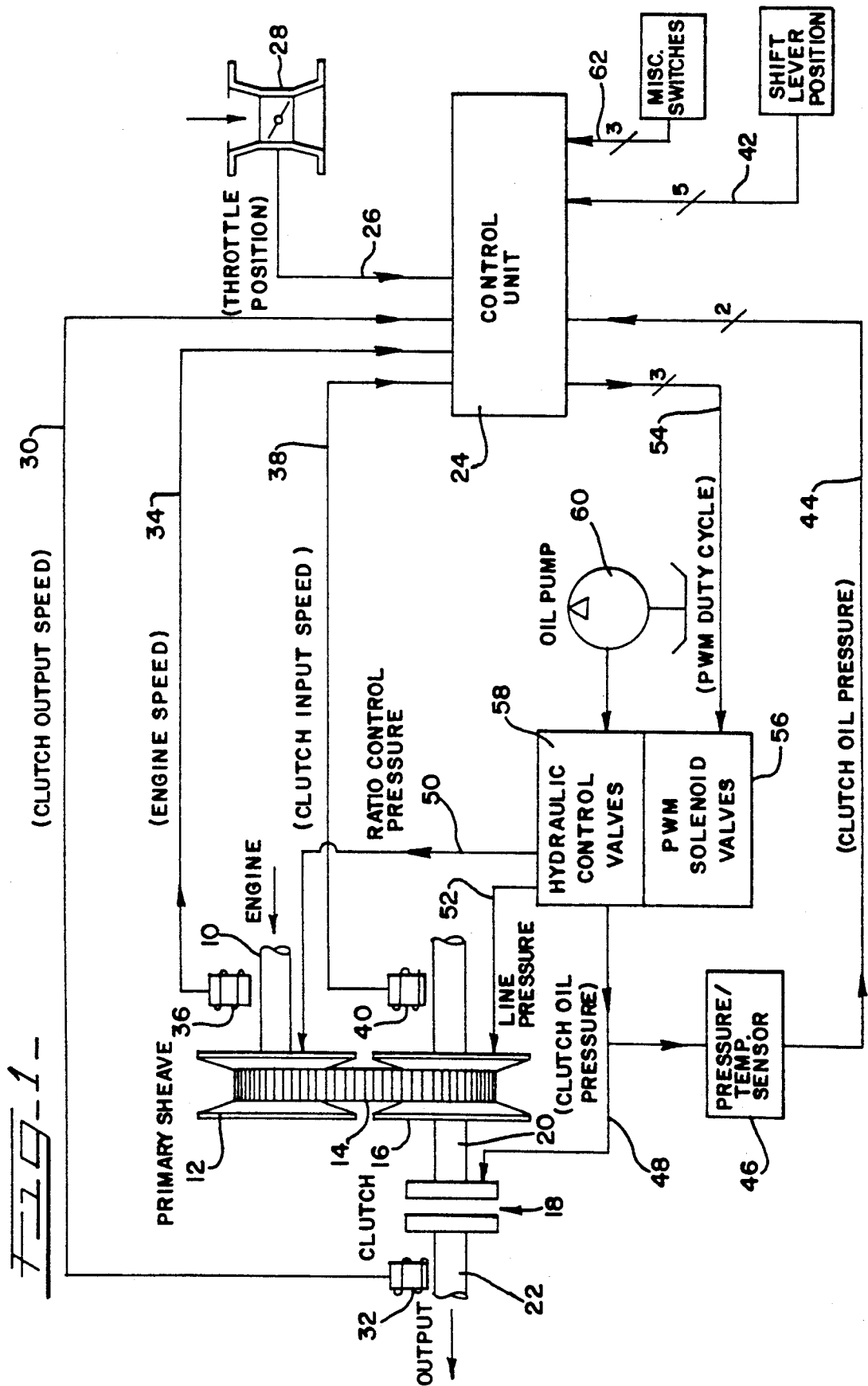
FIG. 1 is a schematic diagram of a continuously variable transmission system which includes the control architecture of the present invention.

FIG. 1 is a schematic illustration of a CVT system which includes the control architecture of the present invention. An engine (not shown) develops power and torque and provides the power and torque at engine output shaft 10. Engine output shaft 10 is coupled to a primary sheave or pulley 12. A flexible metal chain or belt 14 is driven by the primary sheave 12 and, in turn, drives a secondary sheave 16. Secondary sheave 16 is coupled to clutch 18 via shaft 20. Engine power is thereby transmitted via primary sheave 12, chain 14, secondary sheave 16 and shaft 20 to clutch 18, which serves to engage and disengage the engine power and torque from clutch output shaft 22. Clutch output shaft 22 is coupled to the driving wheels of the vehicle in a suitable well known manner such as by way of a differential and drive axles.

The CVT thus described serves to vary the effective gear ratio of the transmission by varying relative diameters of primary sheave 12 and secondary sheave 16. Clutch 18 provides a means by which the engine can be disengaged from the driving wheels of the vehicle so, for example, when the vehicle is at rest, the engine can remain running. Furthermore, by slowly and slipably engaging, the clutch provides a means by which the vehicle can be started from rest in a smooth and comfortable manner.

Control of the relative sheave diameters and control of the degree of clutch engagement is affected by a control architecture within an electronic control unit 24, as described more fully below. Control unit 24 receives a throttle position input signal on line 26 from throttle 28. The throttle position input signal on line 26 may be, for example, a voltage level from a transducer (not shown) at throttle 28 that is proportional to the amount of throttle opening. Control unit 24 receives a clutch output speed signal on a line 30 from a speed transducer 32 located adjacent to output shaft 22. The clutch output speed signal on line 30 may, for example, be proportional to the speed of rotation of output shaft 22. Control unit 24 receives an engine speed signal on a line 34 from a speed transducer 36 located adjacent to engine output shaft 10. The engine speed signal may, for example, be proportional to the speed of rotation of the engine (not shown). Control unit 24 further receives a clutch input speed signal on a line 38 from a speed transducer 40 located adjacent to shaft 20. The clutch input speed signal on line 38 may, for example, be proportional to the speed of rotation of shaft 20, which is the input to clutch 18.

Control unit 24 also receives a shift lever position signal on line 42 from the gear shift (not shown). The shift lever position signal on line 42 may, for example, indicate whether the shift lever is in neutral, reverse, drive, manual 2 or manual 1 position. Control unit 24 receives a "clutch oil pressure" signal on a line 44 from a transducer 46. The clutch oil pressure signal on line 44 may, for example, be proportional to the pressure of the hydraulic oil or fluid in fluid line 48 which is used to control the engagement of clutch 18. Transducer 46 may also provide a clutch oil temperature signal which is conveyed to control unit 24 via line 44.

Control unit 24 functions to control three hydraulic pressures that, in turn, control the operation of the CVT: (1) the clutch oil pressure in hydraulic line 48, (2) a "ratio control pressure" in a hydraulic line 50, and (3) a "line pressure" in a hydraulic line 52. The ratio control pressure in hydraulic line 50 is used to control the relative diameters of primary sheave 12 and secondary sheave 16. The line pressure in hydraulic line 52 is used to ensure that, under varying load conditions, the chain 14 does not slip on the primary sheave 12 or the secondary sheave 16. The hydraulic pressures in lines 48, 50 and 52, which control the operation of the CVT, are controlled by the control unit 24. Control unit 24 generates pulse width modulated control signals on line 54. The pulse width modulated control signals on line 54 control electro-hydraulic solenoid valves 56 which in turn control hydraulic spool valves 58 which operate as flow amplifiers. An oil pump 60 provides hydraulic pressure which is modulated by valves 58 for each of the hydraulic lines 48, 50 and 52. Thus, by varying the duty cycles of the pulse width modulated control signals on line 54, the control unit can control the hydraulic pressures in hydraulic lines 48, 50 and 52 and thereby control the operation of the CVT.

Figure 2:
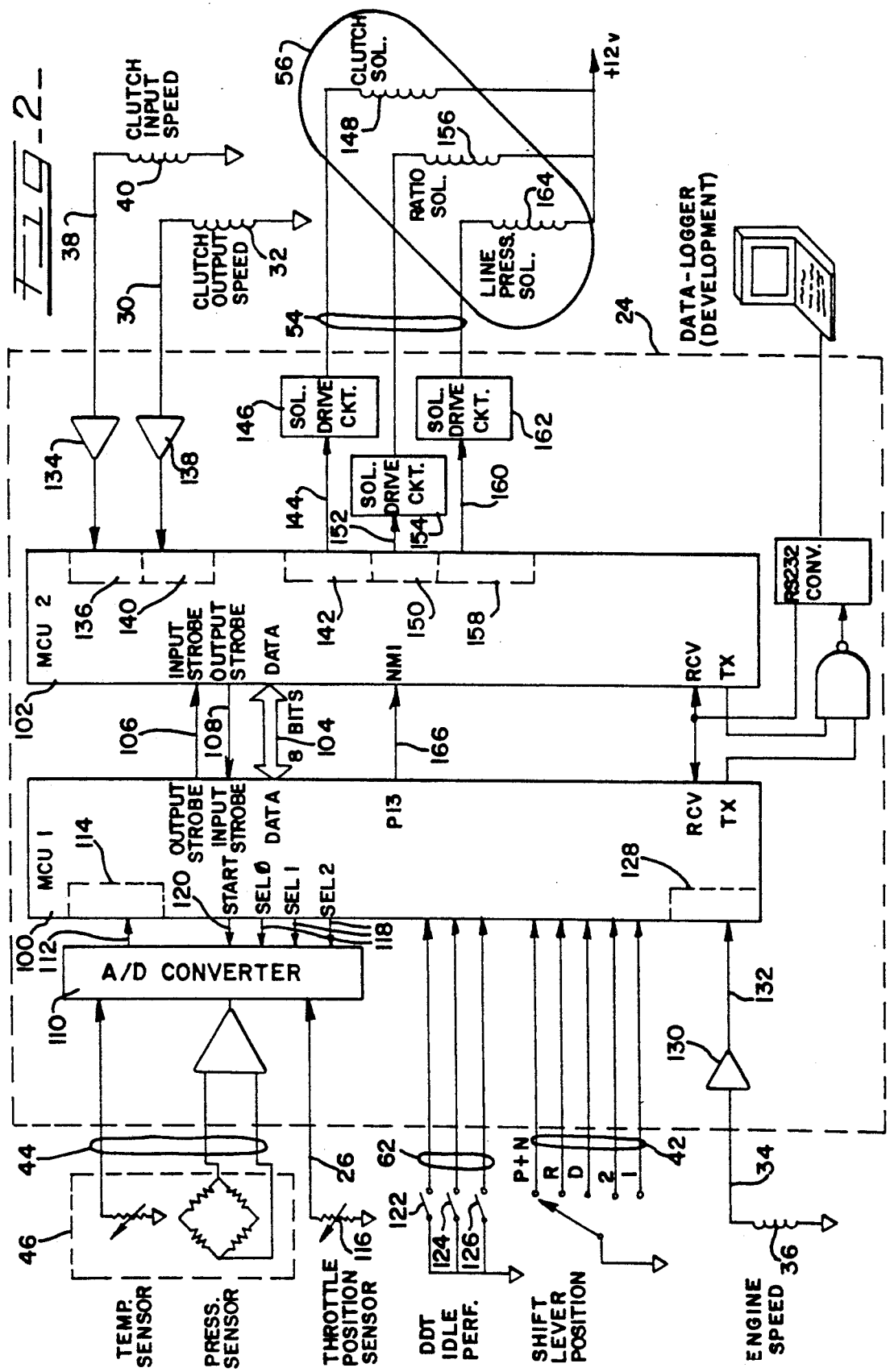
FIG. 2 is a block diagram of one embodiment of the control architecture of the present invention.

Referring now to FIG. 2, the preferred embodiment of the control architecture of the present invention is illustrated with two microcomputers (MCUs). A first microcomputer 100 is communicatively coupled to a second microcomputer 102 via a data bus 104. The first microcomputer 100 is referred to as a "master" microcomputer, and second microcomputer 102 is referred to as a "slave" microcomputer. Microcomputers 100 and 102 may be commercially available 6801U4 integrated circuits. Data bus 104 is an 8 bit parallel bidirectional bus. Data strobe line 106 is used by the first microcomputer 100 to signal to the second microcomputer 102 when data is being transmitted over data bus 104 from the former to the latter. Data strobe line 108 is similarly used by the second microcomputer 102 to signal to the first microcomputer 100 when data is being transmitted in the other direction. Microcomputers 100 and 102 share the tasks in connection with performing the large scale real time computation needed to control a CVT. The first microcomputer 100 performs the main system timing and scheduling functions, initiates and controls communication with the second microcomputer 102 and performs other tasks common to each such as input signal conditioning and processing as well as the overall control strategy for the CVT. The second microcomputer 102 determines the various needed operating pressures that allow the CVT to operate in the desired manner.

Associated with the first microcomputer 100 is an A/D converter 110. A/D converter 110 converts an analog input parameter value to a pulsed signal where the pulse width is proportional to the analog input value. The pulsed signal is provided to the first microcomputer 100 via line 112 to an input capture port 114 which has associated with it an internal timer that facilitates period measurement. The timer associated with input capture port 114 therefore creates a digital signal corresponding to the analog input value converted by the A/D converter 110. The A/D converter receives three analog signals: the clutch oil pressure signal and the clutch oil temperature signal on line 44 from transducer 46 and a throttle position signal on line 26 from a transducer 116 at the throttle 28. The first microcomputer 100 controls A/D converter 110 via one of the "select" lines 118 and a start line 120. The select lines 118 are used to select one of the three incoming analog signals to be converted, and the start line 120 is used to begin the A/D conversion process.

Also connected to the first microcomputer 100 are input signals on line 62 from a driver demand switch 122, a fast idle switch 124 and a performance/economy mode selection switch 126. An engine speed input signal on line 34 from engine speed transducer 36 is input to input capture port 128 of the first microcomputer 100. Like the input capture port 114 described above, input capture port 128 has a timer associated with it that measures the duration of a pulse input and creates a digital signal proportional thereto. The engine speed transducer 36 is a magnetic-type sensor that is capable of sensing discontinuities in ferrous materials. The engine speed transducer 36 is in close proximity to a ferrous gear located on a shaft within the CVT which is driven by the engine crankshaft. As the gear rotates, the transducer 36 generates roughly a sinusoidal signal as each tooth of the gear passes near the transducer 36. The sinusoidal signal on line 34 is subjected to wave shaping circuitry 130 which creates a corresponding square wave signal which is delivered on line 132 to input capture port 128. The duration of a positive going pulse of the square wave signal is counted by the timer associated with input capture port 128, and the result is a digital representation of the engine speed.

Inasmuch as each microcomputer 100 and 102 may have only two input capture ports, clutch input and output speed signals are received by the second microcomputer 102. A clutch input speed signal on line 38 is generated by transducer 40 which functions in a manner similar to that of engine speed transducer 36 as described above. The clutch input speed signal on line 38 is conditioned by signal conditioning circuit 134 which creates a square wave signal received by input capture circuit 136. Likewise, clutch output speed signal 30 is conditioned by signal conditioning circuit 138 which generates a square wave signal received by input capture port 140.

The second microcomputer 102 has output ports that are associated with timer output compare functions that facilitate the creation of pulse width modulated (PWM) square wave signals the duty cycles of which vary depending upon the respective output values. Output port 142 generates a pulse width modulated square wave output on line 144 which, through solenoid drive circuit 146, drives the clutch solenoid 148. By varying the duty cycle of the pulse width modulated signal provided to the clutch solenoid 148, the clutch oil pressure can be controlled. In a similar manner, output port 150 provides a pulse width modulated square wave signal on line 152 which, through solenoid drive circuit 154, controls ratio solenoid 156. By varying the duty cycle of a pulse width modulated signal provided to ratio solenoid 156, the ratio control pressure in hydraulic line 50, as shown in FIG. 1, can be controlled. Likewise, output port 158 provides a pulse width modulated square wave signal on line 160 which, through solenoid drive circuit 162, controls line pressure solenoid 164. By varying the duty cycle of the pulse width modulated signal provided to the line pressure solenoid 164, the line pressure in hydraulic line 52, as shown in FIG. 1,, can be controlled.

Pursuant to the invention, the control architecture incorporates two microcomputers which simultaneously perform separate tasks needed to effect real time CVT control. Communication between the first microcomputer 100 and the second microcomputer 102 is provided because various information, either read by or calculated in one of the microcomputers is often needed by the other. As described more fully hereinafter, the control architecture in the illustrated embodiment can effect control changes at 5 millisecond intervals. For real time control, this means that control law computations must be made every 5 milliseconds. Information required for the computations, therefore, must be passed between the two microcomputers every 5 milliseconds.

In the illustrated embodiment there are two time periods, or cycles, of interest. The basic control system operates on a 10 millisecond period, which is the update time for the pulse width modulated solenoid control signals on line 54 of FIG. 1. That is, when operating in this steady state, the pulse width modulated control signals on line 54 have a 10 millisecond period. However, the clutch oil pressure is controlled with a double edge modulated pulse train on the line 144 of FIG. 2. This means that, although the steady state period between clutch oil pressure control pulses is 10 milliseconds, control law calculations concerning the clutch oil pressure must be made every 5 milliseconds so that both the leading and trailing edges of each pulse on line 144 of FIG. 2 can be independently controlled. Thus, the basic 10 millisecond system period is divided into two "cycles", with each being 5 milliseconds. It is for this reason that information is passed between the two microcomputers every 5 milliseconds.

Each microcomputer 100, 102 has associated with it two tables that govern the transfer of data between the microcomputers. A first table associated with each microcomputer is used to govern the transfer of data at the beginning of the first cycle of each 10 millisecond system period. A second table associated with each microcomputer is used to govern the transfer of data at the beginning of the second cycle of each 10 millisecond system period. The first table associated with the first microcomputer corresponds to the first table associated with the second microcomputer, and the two are used together during the transfer of data during the first cycle of each 10 millisecond system period. Likewise, the second table in the first microcomputer corresponds to the second table on the second microcomputer, with the two being used together during the transfer of data during the second cycle of each 10 millisecond system period. FIG. 3 illustrates an exemplary pair of such tables. Table 200 may be, for example, the first table associated with the first microcomputer 100. Table 202 may be, for example, the first table associated with the second microcomputer 102. Each table has two parts, a "transmit" section and a "receive" section. The transmit section is used to send data from the microcomputer in question, and the receive section is used by that microcomputer when receiving data from the other. A system interrupt signals the beginning of the first cycle, and the first microcomputer informs the second microcomputer that a data transfer will take place by pulsing a non-maskable interrupt (NMI) line shown at 166 in FIG. 2. Each microcomputer then configures its data transfer port for a data transfer from the first microcomputer to the second microcomputer. In the preferred embodiment incorporating 6801U4 microcomputer integrated circuits, the data transfer port is the port number three of each integrated circuit. The first byte to be transferred is the first byte in the first data transfer table of the first microcomputer. This byte contains a table identification number shown at 204. Each byte transferred utilizes the built-in handshaking capabilities of port number three of the 6801U4 microcomputer integrated circuit. When the second microcomputer receives the first byte of information, it checks to see that both microcomputers are operating on the same cycle. This is done by checking the table identification number. If they are not synchronized, a diagnostic procedure is entered.

Data bytes are transferred from the first microcomputer to the second microcomputer. This is accomplished by using pointer information in the transmit half of the first data transfer table of the first microcomputer. The pointer is the actual address of the parameter to be transferred. Accordingly, each byte of a multibyte parameter must have its own pointer. Using an indexed addressing mode in this manner allows for an efficient data transfer. When the second microcomputer receives a byte, it uses the corresponding receive half of its data transfer table to determine the address of the location where the data is to be placed. After all relevant data is transferred from the first microcomputer to the second microcomputer, each microcomputer then reconfigures its port number three for the opposite direction of data flow, that is, from the second microcomputer to the first. Using the second half of the transfer table, which is the transmit half of the table associated with the second microcomputer and the receive half of the table associated with the first microcomputer, the data bytes are then transferred as described above. At the beginning of the second cycle of each 10 millisecond basic system period, a similar bidirectional data transfer takes place, however, the second transfer table of each microcomputer is used.

Each data transfer table is a ROM table consisting of two parts. The first part 206 contains information required for the transferring of data from the first microcomputer to the second microcomputer. This is referred to as the "transmit" half of the first microcomputer and "receive" half of the second microcomputer. The second part 208 contains information needed to send data the other way, from the second microcomputer to the first microcomputer. This is referred to as the "receive" half of the first microcomputer and the "transmit" half of the second microcomputer. The first byte in the table contains a table identification number. Next follows the first half of the table. This consists of a 1-byte parameter count 210 which indicates the number of bytes of data that are being transferred from one microcomputer to the other. Next follow 2-byte address pointers 212, one for each byte of the selected parameters to be transferred. Next follows the second part of the table, which is structured like the first.

Functioning as a real time controller, the control architecture of the present invention receives inputs, performs computations and generates outputs within each of a series of discrete time intervals. The time intervals are sufficiently short such that the operation of the CVT is unimpaired by the discontinuous nature of control. As noted above, the 10 millisecond basic system period is divided into two cycles, a first cycle or "cycle one" and a second cycle or "cycle two". Referring now to FIGS. 4a and 4b a timing diagram of the operation of the control architecture of the present invention is illustrated. A cycle one 220 and a subsequent cycle two 222 comprise a 10 millisecond system period. A system interrupt 224 is programmed to occur every 2.5 milliseconds, with every other system interrupt indicating the beginning of a cycle. Thus, there are two system interrupts per cycle. As described above, each system interrupt that signifies the beginning of a cycle, causes a data transfer 226 to occur between the microcomputers.

Each system interrupt also causes the A/D converter, shown at 110 in FIG. 2, to begin a conversion process. The A/D conversion of the position of the throttle takes place during a time interval 228 which is initiated by the first system interrupt 224 of cycle two 222. Another A/D conversion is initiated following the first system interrupt 224 of cycle one 220. However, the analog value converted during this interval is not the same for each 10 millisecond system period. During the first of three system periods, the clutch oil temperature is converted during the interval 230 following the first system interrupt 224 of cycle one 220. During the second of three 10 millisecond system periods, a low reference voltage is converted during the interval 232 following the first system interrupt 224 of cycle one 220. Finally, during the third of three 10 millisecond system periods, a high reference voltage is converted during an interval 234 following the first system interrupt 224 of cycle one 220. Thus, each of the three analog values is converted once during three basic system periods. The low and high reference voltages are merely used to calibrate the A/D converter.

Unlike the other analog values, the clutch oil pressure is converted once during each cycle. The conversion takes place during an interval 236 following a second system interrupt 224 of each cycle 220, 222.

As noted above, input capture port 128 in FIG. 2 has a timer associated with it that counts the duration of the positive going pulse of the square wave engine speed signal present on line 132 of FIG. 2. At the end of the positive going pulse, the count is a digital representation of the engine speed. The positive going pulse may be short for a high engine speed resulting in a low count, or it may be long corresponding to a low engine speed resulting in a high count. For illustration purposes, a short positive going pulse corresponding to an engine speed of 6,000 rpm is shown at 238 and a long positive going pulse corresponding to an engine speed of 1,000 rpm is shown at 240. Because the engine speed signal is not synchronous with the system interrupt, it may take as long as two times the period of the engine speed signal to obtain a reading. A raw count is obtained at the end of a positive going pulse, and then the first microcomputer 100 calculates the engine rpm during interval 242.

Similarly, the second microcomputer 102 obtains new clutch input speed data at input capture port 136 in FIG. 2. During interval 244 a positive going pulse is counted and at the end of the positive going pulse, the new clutch input speed rpm is calculated during interval 246. Also, the second microcomputer obtains new clutch output speed data at input capture port 140. A timer counts the positive going pulse during interval 248.

Following the A/D conversion of the clutch oil pressure signal during interval 236, the clutch oil pressure reading is normalized during interval 250. Likewise, following the A/D conversion of the throttle position occurring during interval 228, the throttle reading is normalized during interval 252.

Following the transfer of data occurring during interval 226 at the beginning of cycle two 222, the leading edge for the next pulse of the pulse width modulated clutch oil pressure control signal is calculated during interval 254. Likewise, following the data transfer occurring during interval 226 at the beginning of cycle one 220, the trailing edge of the next pulse of the pulse width modulated clutch oil pressure signal is determined during interval 256. The leading edge of that pulse 258 occurs during the cycle one 220 following interval 254. Likewise, the trailing edge of that pulse 260 occurs during the cycle two 222 immediately following interval 226. By double edge modulating the clutch oil pressure signal in this manner, precise clutch control can be obtained.

Immediately following interval 254, the pulse width of the next pulse of the ratio control signal is calculated during interval 262. That pulse is then centered about the second following transition from a cycle two 222 to a cycle one 220. Unlike the clutch oil pressure control, the ratio control is calculated only once every two cycles, and the leading edge 264 of the pulse is not controlled independently of the trailing edge 266. The ratio control pulse is therefore single edge modulated about a transition from a cycle two 222 to a cycle one 220.

Immediately following interval 256 during a cycle one 220, the pulse width of the next pulse of the line pressure control signal is determined during interval 268. That pulse is then centered about the second following transition from a cycle one 220 to a cycle two 222. Like the ratio control calculation, the line pressure control calculation is made only once every two cycles, and the leading edge of the pulse 270 is not determined independently of the trailing edge of the pulse 272. The pulse is thus single edge modulated about a transition from a cycle one 220 to a cycle two 222.

Collectively, all of the input signals allow the control system to determine the desired operating conditions. Using input information from the driver as well as from the current operating status, the system generates the appropriate output signals to obtain or maintain the desired CVT performance.

According to the invention, the tasks performed in controlling a CVT are shared between two microcomputers. The tasks are divided between the two microcomputers, and, in general, the tasks performed by each fall into two categories. The first category of tasks include "foreground" tasks. Foreground tasks are those that need to be initiated and fully completed during each 10 millisecond basic system period. Foreground tasks include scheduling and initiating the reading of input signals, scaling the input signals, updating filters, executing the control strategy, executing control algorithms and generating the pulse width modulated control outputs.

The second category of tasks performed by each microcomputer are denominated "background" tasks. Background tasks are secondary activities that need not be fully completed within each 10 millisecond system period. Background tasks include temperature compensation, parameter calibration, failure diagnosis and communication with development equipment.

Referring now to FIG. 5, a block diagram of the software tasks performed by each microcomputer is illustrated. When system operation is commenced, program initialization occurs in each microcomputer at block 280. Immediately after program initialization, a scheduler routine in each microcomputer is entered at block 282. The scheduler routine at block 282 of each microcomputer allocates the tasks to be performed by that microcomputer and handles its communications with the other. The scheduler routines of the respective microcomputers initiate the performance of the background tasks. As shown in FIG. 5, the background tasks performed by the first microcomputer, at block 284, include communication with development equipment, self-calibration of the system and diagnostics. The background tasks performed by the second microcomputer, shown at block 286, include communication with development equipment and diagnostics.

Performance of foreground tasks is initiated when a system interrupt occurs. Upon the occurrence of an interrupt, as is well known, the program under execution, in this case performance of the background tasks, is interrupted and temporarily suspended so that other higher priority tasks can be immediately performed. The system interrupt is simply a timer within the microcomputers that generates an interrupt at regular intervals. In this way, the background tasks being performed are automatically interrupted when a system interrupt occurs. It is this event that initiates performance of the foreground tasks. After a system interrupt, the scheduler routine of each microcomputer controls program execution so that the foreground tasks to be performed by each microcomputer are in fact completed within the 10 millisecond system period and before execution of the background tasks is resumed.

Foreground tasks performed by the first microcomputer, shown at block 288, include input signal processing of the A/D converter's output and the speed signals and execution of the control strategy, which is the program that governs the operating mode of the CVT. Foreground tasks performed by the second microcomputer, shown at block 290, include computation of the required line pressure, computation of the required clutch oil pressure, computation of the required ratio control pressure and generation of the pulse width modulated output signals.

The control architecture thus described provides very efficient control of a CVT. Being interrupt driven, the allocation of foreground tasks is very simple and requires almost no overhead by the microcomputers. After program initialization, the scheduler routines of the respective microcomputers sequentially call other parts of software to perform each background task in turn. When a system interrupt occurs, the scheduler then calls routines that perform the required foreground tasks. After the foreground tasks are fully completed, execution is returned to the point where the execution of the background tasks was interrupted.

The above illustrative embodiment depicts a control architecture for continuously variable transmissions. Each aspect of the illustrated embodiment is exemplary, and the scope of the invention is not intended to be limited to the specific embodiments shown or described. Rather, the scope of the invention is intended to encompass those modifications and variations that may be apparent to those persons skilled in the art to which the subject matter pertains.

I claim:

1. A method for controlling a continuously variable transmission in a vehicle engine, the steps comprising:
   receiving a first set of input signals in a first microcomputer means, said first set of input signals representing selected engine parameters;
   receiving a second set of input signals in a second microcomputer means, said second set of input signals also representing selected engine parameters;
   directly transferring a succession of data bytes in both directions via bidirectional communication means interconnecting said first microcomputer means and said second microcomputer means;
   utilizing control programs stored in said first microcomputer and said second microcomputer to direct said first microcomputer to perform a first set of control tasks including the calculation of intermediate signals based on said first set of input signals, and transferring said intermediate signals to said second microcomputer means via said bidirectional communication means;
   also utilizing said control programs to direct said second microcomputer to perform a second set of control tasks and calculate a set of output control signals based on said second set of input signals and said intermediate signals;
   said output control signals being coupled to the continuously variable transmission so that said first microcomputer means, said second microcomputer means and said control programs combine to control the continuously variable transmission.

2. The method of claim 1 wherein said first set of input signals includes a clutch oil temperature signal, a clutch oil pressure signal, a throttle position signal, an indication of shift lever position and a periodic square wave-type signal representative of engine speed; and wherein said second set of input signal includes a periodic square wave-type signal representative of clutch input speed and a periodic square wave-type signal representative of clutch output speed.

3. The method of claim 1 wherein said first set of control tasks include processing input signals and executing control strategy; and wherein said second set of control tasks include determining output control signals for controlling the continuously variable transmission.

4. An apparatus for controlling a continuously variable transmission in a vehicle engine, the apparatus comprising:
   first microcomputer means for receiving a first set of input signals representing selected engine parameters;
   second microcomputer means for receiving a second set of input signals also representing selected engine parameters;
   direct bidirectional communication means for communicatively interconnecting said first microcomputer means and said second microcomputer means, said direct bidirectional communication means being effective for directly transferring a succession of data bytes in both directions therebetween; and control programs stored in said first microcomputer and said second microcomputer for directing said first microcomputer to perform a first set of control tasks including the calculation of intermediate signals based on said first set of input signals, and transferring said intermediate signals directly to said second microcomputer means via said direct bidirectional communication means;

said control programs also directing said second microcomputer to perform a second set of control tasks and calculate a set of output control signals based on said second set of input signals and said intermediate signals;

said output control signals capable of being coupled to the continuously variable transmission, whereby said first microcomputer means, said second microcomputer means and said control programs combine to control the continuously variable transmission.

5. The apparatus of claim 4 further comprising means for converting analog input signals into a form receivable by one of said microcomputer means.

6. The apparatus of claim 4 wherein said first set of input signals includes a clutch oil temperature signal, a clutch oil pressure signal, a throttle position signal, an indication of shift lever position and a periodic square wave-type signal representative of engine speed; and wherein said second set of input signal includes a periodic square wave-type signal representative of clutch input speed and a periodic square wave-type signal representative of clutch output speed.

7. The apparatus of claim 4 wherein said first set of control tasks include processing input signals and executing control strategy; and wherein said second set of control tasks include determining output control signals for controlling the continuously variable transmission.

8. The apparatus of claim 4 wherein:
said first microcomputer means further comprises a first transfer table having a transmit section with pointer bytes referencing memory locations in said first microcomputer means containing data to be transferred and a receive section with pointer bytes referencing memory locations in said first microcomputer means for receiving transferred data;
said second microcomputer means further comprises a second transfer table having a transmit section with pointer bytes referencing memory locations in said second microcomputer means containing data to be transferred and a receive section with pointer bytes referencing memory locations in said second microcomputer means for receiving transferred data; and
said communication means comprises a bidirectional data bus for carrying bytes of transferred data directly between said first and second microcomputer means.

9. An apparatus for controlling a continuously variable transmission device in a vehicle engine, the apparatus comprising:
master microcomputer means for receiving a first set of input signals representing selected engine parameters and for performing a first set of control tasks including the calculation of information based on said input signals and the generation of data bytes representing said information;
means for cooperating with said master microcomputer means for transmitting a succession of said data bytes over a data bus directly to a slave microcomputer; and
means together with said slave microcomputer means for cooperating with said data bus for receiving and storing in a memory said succession of data bytes directly transmitted over said data bus from said master microcomputer;
said slave microcomputer means being effective for receiving a second set of input signals also representing selected engine parameters and for performing a second set of control tasks including the generation of output control signals in accordance with said second set of input signals and said data bytes retrieved from said memory;
said output control signals capable of being coupled to the continuously variable transmission, whereby said master microcomputer, said slave microcomputer and said output control signals combine to control the continuously variable transmission.

10. The apparatus of claim 9 wherein said second set of control tasks includes the generation of a second set of data bytes representing calculations made by said slave microcomputer, said apparatus further comprises:
means for cooperating with said slave microcomputer means for transmitting a succession of said second set of data bytes over said data bus directly to said master microcomputer; and
means together with said master microcomputer means for cooperating with said data bus for receiving and storing in a second memory said succession of said second set of data bytes directly transmitted over said data bus from said slave microcomputer;
said master microcomputer means being effective to generate data bytes in accordance with said first set of input signals and said second set of data bytes retrieved from said second memory.

11. The apparatus of claim 8 wherein:
said first microcomputer means further comprises a third transfer table having a transmit section with pointer bytes referencing memory locations in said first microcomputer means containing data to be transferred and a receive section with pointer bytes referencing memory locations in said first microcomputer means for receiving transferred data; and
said second microcomputer means further comprises a fourth transfer table having a transmit section with pointer bytes referencing memory locations in said second microcomputer means containing data to be transferred and a receive section with pointer bytes referencing memory locations in said second microcomputer means for receiving transferred data.

12. The apparatus defined in claim 11 wherein:
the apparatus generates a continuous train of interrupts, said interrupts being in sets of four such that a first of each set defines the beginning of a first cycle and the third of each set defines the beginning of a second cycle, said first and second cycles defining a basic system period;
said first and second transfer tables being configured to transmit and receive data directly between the first and second microcomputers during said first cycle; and
said third and fourth transfer tables being configured to transmit and receive data directly between the first and second microcomputers during said second cycle.

* * * * *